(12) United States Patent
Kaimai et al.

(10) Patent No.: US 7,601,253 B2
(45) Date of Patent: Oct. 13, 2009

(54) PROCESS OIL AND PROCESS FOR PRODUCING THE SAME

(75) Inventors: Takashi Kaimai, Toda (JP); Yoshiyuki Morishima, Toda (JP); Kenji Fujino, Toda (JP)

(73) Assignee: Japan Energy Corporation, Tokyo (JP)

( * ) Notice: Subject to any disclaimer, the term of this patent is extended or adjusted under 35 U.S.C. 154(b) by 649 days.

(21) Appl. No.: 10/491,060

(22) PCT Filed: Sep. 30, 2002

(86) PCT No.: PCT/JP02/10140

§ 371 (c)(1),
(2), (4) Date: Mar. 3, 2006

(87) PCT Pub. No.: WO03/031537

PCT Pub. Date: Apr. 17, 2003

(65) Prior Publication Data

US 2006/0254955 A1    Nov. 16, 2006

(30) Foreign Application Priority Data

Oct. 2, 2001   (JP) ............................. 2001-306009

(51) Int. Cl.
  *C07C 7/10*   (2006.01)
  *C10M 101/02*   (2006.01)
(52) U.S. Cl. .................... 208/19; 208/309; 208/314; 208/322; 524/484; 585/1; 585/13
(58) Field of Classification Search .................... 208/19
See application file for complete search history.

(56) References Cited

U.S. PATENT DOCUMENTS 4,399,252 A * 8/1983 Cunningham ................ 524/484
5,488,193 A * 1/1996 Mackerer et al. ............ 585/455
5,935,417 A * 8/1999 Cody et al. .................... 208/87
6,103,808 A * 8/2000 Hashimoto ................... 524/484
6,146,520 A * 11/2000 Gupte et al. ................. 208/322
6,248,929 B1 * 6/2001 Kaimai et al. ................ 585/241
6,399,697 B1 * 6/2002 Takasaki et al. ............. 524/575
6,605,695 B2 * 8/2003 Takasaki et al. ................ 528/2
6,878,263 B2 * 4/2005 Kaimai et al. .................. 208/14
6,974,535 B2 * 12/2005 Cody et al. ..................... 208/57

FOREIGN PATENT DOCUMENTS

| EP | 0 933 418 A2 | 8/1999 |
| EP | 0 950 703 A2 | 10/1999 |
| JP | 11-80434 | 7/1989 |
| JP | 11-246709 | 9/1999 |

\* cited by examiner

*Primary Examiner*—Ellen M McAvoy
(74) *Attorney, Agent, or Firm*—Sonnenschein Nath & Rosenthal LLP

(57) ABSTRACT

A process oil comprising a 95/5 to 5/95 by weight mixture of: an extract having a DMSO extractable content less than 3 wt % obtained by solvent-extracting an oil obtained by deasphalting a vacuum distillation bottom; and either a mineral oil base having a DMSO extractable content less than 3 wt % which is a raffinate obtained by the solvent refining of a vacuum distillate or a mineral oil base having a DMSO extractable content less than 3 wt % obtained by subjecting a raffinate obtained by the solvent refining of a vacuum distillate to hydrorefining and/or dewaxing. The process oil has a kinematic viscosity at 100° C. of less than 32 mm2/s, % CA of 15 to 30, aniline point of 100° C. or lower, weight change through evaporation of 0.5% or less, and mutagenicity index of less than 1.

7 Claims, No Drawings

PROCESS OIL AND PROCESS FOR PRODUCING THE SAME

TECHNICAL FIELD

The present invention relates to a process oil to be added to natural rubber or synthetic rubbers. More specifically, the present invention relates to a process oil having neither toxicity nor carcinogenicity due to its reduced content of polycyclic aromatic compounds, as well as good handling property, and a manufacturing method thereof.

BACKGROUND ART

Process oils are used for facilitating rubber manufacturing processes such as kneading, extruding, or forming, on account of their good permeability into rubber polymer structures. Process oils are also used for improving physical properties of rubber products. These process oils are required to possess adequate affinity to rubbers. Rubbers to be processed include natural rubber and synthetic rubbers, with the synthetic rubbers ranging over a variety of types and kinds. Among such rubbers, natural rubber and styrene-butadiene rubber (SBR) in particular are used in large quantities, for which process oils that are rich in aromatic hydrocarbon content and possess high affinity to rubbers are generally used.

Process oils as described above are manufactured by utilizing so-called extracts produced from extraction processes using solvents having affinity to aromatic hydrocarbons, as applied to lubricating oil fractions produced through vacuum distillation of crude petroleum, or stocks obtained after appropriate dewaxing or hydrorefining, if necessary, deasphalted oil of vacuum distillation residues.

Process oils obtained in the manner mentioned above contain 70 to 99 mass % of aromatic compounds by measuring through a column chromatography, have 20 to 50% $C_A$ by n-d-M ring analysis, and contain 5 to 25 mass % of dimethylsulfoxide (DMSO) extractable content corresponding to the content of polycyclic aromatic compounds (PCA), determined in accordance with the IP346 test method as specified by The Institute of Petroleum.

However, in recent years, the carcinogenicity of PCA is being taken more seriously. In Europe, there is a regulatory movement to control the use of oils containing 3 mass % or more of DMSO extractable content, including a toxicity labeling requirement for such products. It is therefore an urgently required task to reduce the DMSO extractable content in process oils to less than 3 mass %.

Concerning process oils containing less than 3 mass % of DMSO extractable content, Japanese Patent Publication of the Translation of International Patent Application No. 6-505524 discloses a method of manufacturing a process oil, in which a vacuum distillation residue is first treated in a deasphalting process followed by a dewaxing treatment to reduce the DMSO extractable content to less than 3 mass %.

However, the process oil obtained in the above-mentioned method exhibits a high aniline point as a result of reducing the DMSO extractable content. The aniline point is a measure of aromatic hydrocarbon content in the oil. The aniline point becomes higher as the aromatic hydrocarbon content in the oil declines. A process oil having a reduced aromatic hydrocarbon content has a reduced affinity toward rubbers and therefore has a reduced degree of a quality necessary for process oils, i.e. reduced permeability into rubber polymers, thereby making it difficult to impart satisfactory physical properties to the finished rubber products.

Also in Japanese Patent Publication of the Translation of International Patent Application No. 7-501346, there are disclosed a non-carcinogenic bright stock extract and/or a deasphalted oil as well as their refining processes, wherein it is proposed to use a process parameter that correlates to the mutagenicity index (MI) as an indicator of the refining degree to reduce the MI to less than one. In the above publication, an oil obtained by deasphalting a residual fraction in a vacuum distillation column, or an oil having a reduced content of aromatic compounds obtained by an extraction of the deasphalted oil or an oil obtained by dewaxing of such an extracted oil are employed. It is however estimated that those oils may contain 3 mass % or more of DMSO extractable content. The above patent publication does not mention about the correlation between the MI and the DMSO extractable content of such deasphalted oil.

As a solution for the above-mentioned problems, the present inventors have proposed in Japanese Patent Application No. 2001-108354 a manufacturing method of a process oil having high permeability to rubber polymers and a DMSO extractable content of less than 3 mass %. However, this process oil presented a problem due to its high viscosity which provided poor working efficiency during the rubber compounding process.

The present invention has been made to solve problems as described in the above. An object of the present invention is to provide a process oil having excellent permeability into rubber polymers and high safety as provided by a DMSO extractable content of less than 3 mass % as well as improved working efficiency, and a manufacturing method thereof.

DISCLOSURE OF THE INVENTION

The present invention relates to:

(1) A process oil comprising, in a mixing ratio of 95/5 to 5/95 (mass), (i) an extract obtained by solvent refining of a deasphalted oil of a vacuum distillation residue, having a DMSO extractable content of less than 3 mass %, (ii) a mineral base oil comprising a raffinate obtained by solvent refining of a vacuum distillate, having a DMSO extractable content of less than 3 mass %, or a mineral base oil obtained by hydrorefining and/or dewaxing of a raffinate obtained by solvent refining of a vacuum distillate, having a DMSO extractable content of less than 3 mass %, the process oil having a kinematic viscosity of less than 32 mm²/s at 100° C., a % $C_A$ of 15 to 30, an aniline point of 100° C. or lower, an evaporation mass variation percentage of 0.5% or lower, and a mutagenicity index of less than 1;

(2) a process oil as described in (1) above, wherein the extract has a kinematic viscosity of 50 to 100 mm²/s at 100° C., a % $C_A$ of 15 to 35, an aniline point of 90° C. or lower, and an aromatic hydrocarbon content of 60 mass % or higher as determined by chromatography;

(3) a process oil as described in (1) above, wherein the mineral base oil has a kinematic viscosity of 4 to 20 mm²/s at 100° C., a % $C_A$ of 3 to 20, an aniline point of 120° C. or lower, and an aromatic hydrocarbon content of 10 mass % or higher as determined by chromatography; and (4) a manufacturing method of a process oil comprising admixing, in a mass ratio of 95/5 to 5/95, an extract obtained by subjecting the deasphalted oil, which is obtained by deasphalting a vacuum distillation residue to reduce the carbon residue content to 1.6 mass % or lower, to a solvent refining while controlling the extract yield of 35% to 60%, having a DMSO extractable content of less than 3 mass %, with a mineral base oil comprising a raffinate having a DMSO extractable content of less than 3 mass %, obtained by solvent refining of a vacuum distillate having an atmospheric equivalent boiling point of 300 to 700° C., or a mineral base oil having a DMSO extractable content of less than 3 mass %, obtained by hydrorefining and/or dewaxing of a raffinate obtained by solvent refining of a vacuum distillate having an atmospheric equivalent boiling point of 300 to 700° C.

BEST MODE FOR CARRYING OUT THE PRESENT INVENTION

The process oil of the present invention comprises a mixture of an extract obtained by solvent extraction of a deasphalted oil and a raffinate or a mineral base oil obtained by refining a raffinate. Whereas the mixing ratio is between 95/5 and 5/95 in mass ratio, it is particularly preferable to make a such ratio between 80/20 and 20/80 since the preparation of the desired process oil is facilitated. In such a mixing ratio, the process oil can be prepared to have a kinematic viscosity of less than 32 mm$^2$/s at 100° C. (determined by a method specified in JIS K2283-1993), a % $C_A$ of 15 to 30 (determined by a method specified in ASTM D2140), an aniline point of 100° C. or lower (determined by a method specified in JIS K2256-1998), an evaporation mass variation percentage of 0.5% or lower (determined by a method specified in Paragraph 6.9 "Evaporation Test" of JIS K2207, where the evaporation mass variation percentage is determined by measuring the change in the mass of a sample after allowing the sample to stand for three hours in a thermostatic oven at 163° C. and calculating the change as a percentage to the mass of the sample before heating), and a mutagenicity index of less than 1 (determined by a method specified in ASTM E1687-98).

If the process oil prepared as above has a kinematic viscosity of 32 mm$^2$/s or higher at 100° C., the working efficiency of compounding the process oil to the rubber is reduced and at the same time the viscosity reduction in the compounded rubber product is insufficient. If the % $C_A$ of the process oil is less than 15, the physical properties of the finished rubber products deteriorate. If the % $C_A$ of the process oil is more than 30, the physical characteristics of the finished rubber products also deteriorate. Moreover, at an aniline point in excess of 100° C., the oil compatibility with rubber is reduced. At an evaporation mass variation percentage exceeding 0.5%, the working efficiency of compounding the process oil to the rubber is reduced and at the same time the physical properties of the finished rubber products deteriorate due to the evaporation of oil during the vulcanizing treatment of the compounded rubber. Moreover, at a mutagenicity index exceeding one, the carcinogenic potential of the oil may increase.

While the extract used in the present invention has a high concentration of aromatic components, the extract is prepared by solvent extraction of a deasphalted oil of a vacuum distillation residue to control the DMSO extractable content (as determined in accordance with the IP346 test method specified by The Institute of Petroleum) at a level less than 3 mass % for the necessity of minimizing the content of polycyclic aromatic compounds from the viewpoint of reducing carcinogenicity.

The extract preferably has a kinematic viscosity of 50 to 100 mm$^2$/s at 100° C., a % $C_A$ of 15 to 35, an aniline point of 90° C. or lower, and an aromatic hydrocarbon content of 60 to 95 mass % as determined by chromatography, since the preparation of a process oil having the above-mentioned properties is facilitated.

The mineral base oil is mixed mainly with an aim of adjusting the viscosity without harming the desirable properties of the above extract as a process oil. A raffinate having a DMSO extractable content of less than 3 mass % obtained by solvent refining of a vacuum distillate, or an oil obtained by hydrorefining or dewaxing a raffinate which has a DMSO extractable content of not less than 3 mass % or for which such a treatment is desired to specifically bring its DMSO extractable content at a level less than 3 mass %, is used as the mineral base oil.

The mineral base oil preferably has a kinematic viscosity of 4 to 20 mm$^2$/s at 100° C., a % $C_A$ of 3 to 20, an aniline point of 120° C. or lower, and an aromatic hydrocarbon content of 10 mass % or higher as determined by chromatography, since the preparation of a process oil having the above-mentioned properties is facilitated.

The extract having the desired properties as described above can be prepared in an extraction process using a solvent having high affinity to aromatic hydrocarbons, as applied to a deasphalted oil obtained by deasphalting a vacuum distillation residue produced through vacuum distillation, under specific conditions, of an atmospheric residue obtained by atmospheric distilling a crude oil, after which the extract is separated and recovered from the solvent.

For the crude oil as the starting material for the above-mentioned preparation process, while it is possible to use various types of crude oils such as paraffinic crude oils, naphthenic crude oils, and the like, in single or in mixture thereof, it is particularly preferred to use paraffinic crude oils.

The vacuum distillation is preferably operated under the conditions where the obtained distillate has an atmospheric equivalent end point of 580° C. or higher, or the vacuum residue has an initial boiling point of 450° C. or higher, since the aromatic content in the extract obtained can be easily adjusted within a specific range.

The next step of deasphalting the residue obtained in the above vacuum distillation is preferably operated under the conditions that the deasphalted oil may have 1.6 mass % or less of carbon residue. At a carbon residue content exceeding 1.6 mass %, the PCA content in the extract increases and oxidation stability of the resultant high-viscosity base oil tends to be adversely affected.

The deasphalted oil obtained in the above-mentioned method is then treated with extraction using a solvent having selective affinity towards aromatic hydrocarbons. For the solvent having selective affinity to aromatic hydrocarbons, one or more from furfural, phenol, and N-methyl-2-pyrrolidone can be chosen and used. It is preferred to operate the above solvent extraction process under a condition where the extract yield is controlled between 35% and 60%. Under the conditions where the extract yield falls below 35%, it becomes difficult to bring the DMSO extractable content below 3 mass %; whereas at an extract yield exceeding 60%, the aromatic content in the extract could become insufficient. While it is impossible to unambiguously define specific extraction conditions to control the extract yield within the above-mentioned range because the conditions are dependent on the composition of the deasphalted oil, such adjustments are made available by appropriate selection of the solvent ratio, operating pressure, operating temperature and other process parameters. Generally speaking, it is preferred to cause the solvent to contact the deasphalted oil at a temperature 60° C. or higher, preferably 60 to 155° C., and at a solvent/oil ratio (in volume) of about 2/1 to 7/1.

The mineral base oil having the aforementioned properties is prepared by solvent refining of a vacuum distillate having an atmospheric equivalent boiling point of 300 to 700° C., using a solvent having selective affinity towards aromatic hydrocarbons. For the solvent with selective affinity to aromatic hydrocarbons, one or more selected from furfural, phenol, and N-methyl-2-pyrrolidone can be used. In the solvent refining process, conditions conventionally applied for refining lubricating base oils can be used. If furfural is used as the extraction solvent, for example, it is preferred to cause the solvent to contact the base oil at a temperature of 60 to 155° C. and at a solvent/oil ratio (in volume) of about 1/1 to 3/1. Among the raffinates prepared in the aforementioned method, most of those obtained by treating naphthenic crude oils contain less than 3 mass % of DMSO extractable content and satisfy the desired properties as described above without additional processing. Therefore, such raffinates can be used as the mineral base oil.

A more preferable mineral base oil can be obtained by dewaxing a raffinate using hydrorefining and/or solvent dewaxing or hydrodewaxing a raffinate treatment, which has a DMSO extractable content of 3 mass % or more or for which such a is desired.

The aforementioned hydrorefining is preferably proceeded in the presence of a catalyst supported one or more of active metals such as nickel, cobalt, and molybdenum on a carrier such as alumina, silica-alumina, or the like, under a hydrogen pressure of 5 to 15 MPa, at a temperature of 300 to 400° C., and with a liquid hourly space velocity (LHSV) of 1 to 5 $Hr^{-1}$. Further, the above solvent dewaxing is preferably proceeded, for example, in the presence of a methyl ethyl ketone/toluene mixed solvent, at a solvent/oil ratio (in volume) of 1/1 to 5/1 and at a temperature of –10° C. to –40° C. The hydrodewaxing is preferably proceeded in the presence of a zeolite catalyst, under a hydrogen pressure of 5 to 15 MPa, at a temperature of 300 to 400° C., and with an LHSV of 1 to 5 $Hr^{-1}$.

The process oil can be manufactured by admixing the extract and the mineral base oil obtained in the aforementioned methods in a mass ratio of 95/5 to 5/95, particularly preferably 80/20 to 20/80.

The process oil of the present invention as described above exhibits superior safety and high permeability into rubber polymers, and shows no oil bleeding in the compounded rubber, and has a low viscosity, thereby exhibiting particular effects in improving the working efficiency in rubber compounding process to a great extent.

EXAMPLES

In the following sections, the present invention will be described with reference to examples and comparative examples. However, the present invention is not in any way restricted to these examples.

The measurements of oil properties cited in the present invention have been made in accordance with test methods as listed below:

[Determination of Polycyclic Aromatic Compound (PCA) Content (DMSO Extractable Content)]
The DMSO extractable content was determined in accordance with IP346 test method (1992) as specified by the Institute of Petroleum.

[Ring Analysis]
The ring analysis value % $C_A$ was calculated according to a method specified in ASTM D2140-97.

[Kinematic Viscosity]
Determined by a method specified in JIS K2283-1993.

[Aniline Point]
Determined by a method specified in JIS K2256-1998.

[Viscosity Index]
Calculated by a method specified in JIS K2283-1993.

[Aromatic Content by Chromatography]
Determined by a method specified in ASTM D2007-98.

[Mutagenicity Index (MI)]
Determined by a method specified in ASTM E1687-98.

[Carbon Residue]
Determined by a method specified in JIS K2270-1998.

[Evaporation Mass Variation Percentage]
Determined by a method applying the one specified in Paragraph 6.9 "Evaporation Test" of JIS K2207, where the evaporation mass variation percentage was calculated by measuring the mass of a sample after allowing the sample to stand for three hours in a thermostatic oven at 163° C.

Preparation of the Extract Component

Arabian Light crude oil was vacuum distilled to produce vacuum distillate having an atmospheric equivalent end point of 600° C., and the vacuum residue was treated with propane-deasphalting (provided at a solvent ratio of 700%, a pressure of 3.4 MPa, and a temperature of 72° C.) to result in the carbon residue of 1.3 mass % in the deasphalted oil. A solvent extraction treatment using furfural as the solvent was then carried out at a solvent/oil ratio of 400% and at 120° C. so that the extract yield became 42%.

The above-mentioned extract had a DMSO extractable content of 2.5 mass %, a kinematic viscosity of 59.3 $mm^2$/s at 100° C., a % $C_A$ of 23.9, an aniline point of 83° C., and an aromatic content of 72% as determined by chromatography.

Preparation of Mineral Base Oils

Base Oil 1

A vacuum distillate derived from Arabian Light crude oil and having an atmospheric equivalent boiling point of 325 to 530° C. was treated with furfural solvent refining (solvent/oil ratio of 200% by volume, and temperature of 100° C.). The resultant raffinate was then refined by hydrorefining using a Ni/Mo/$Al_2O_3$ catalyst at a hydrogen pressure of 9 MPa, an LHSV of 4 $Hr^{-1}$, and a temperature of 315° C., followed by removing light fractions and solvent dewaxing (methyl ethyl ketone: toluene=1:1, solvent/oil ratio: 250%, cooled to –20° C.) to obtain a mineral base oil having properties as shown in Table 1.

Base Oil 2

A vacuum distillate derived from Arabian Light crude oil and having atmospheric equivalent boiling point of 362 to 600° C. was treated with furfural solvent refining (solvent/oil ratio of 200% by volume, and temperature of 110° C.). The resultant raffinate was then refined by hydrorefining using a Ni/Mo/$Al_2O_3$ catalyst at a hydrogen pressure of 9 MPa, an LHSV of 4 $Hr^{-1}$, and a temperature of 330° C., followed by removing light fractions and solvent dewaxing (methylethyl ketone: toluene=1:1, solvent/oil ratio: 250%, cooled to –20° C.) to obtain a mineral base oil having properties as shown in Table 1.

Base Oil 3

A vacuum distillate derived from Wandu crude oil (a naphthenic crude oil) and having an atmospheric equivalent boiling point of 340 to 570° C. was treated with furfural solvent refining (solvent/oil ratio of 300% by volume, and temperature of 110° C.) to obtain a raffinate having properties as shown in Table 1.

Base Oil 4

A vacuum distillate derived from Arabian Light crude oil and having an atmospheric equivalent boiling point of 360 to 590° C. was treated with hydrocracking using a Ni/W/Al$_2$O$_3$ catalyst at a hydrogen pressure of 15 MPa, an LHSV of 0.3 Hr$^{-1}$, and a temperature of 390° C., followed by removing light fractions and solvent dewaxing (methylethyl ketone: toluene=1:1, solvent/oil ratio: 250%, cooled to −20° C.) to obtain a mineral base oil having properties as shown in Table 1.

Base Oil 5

A vacuum distillate derived from Arabian Light crude oil and having an atmospheric equivalent boiling point of 251 to 425° C. was refined with hydrorefining using a Ni/Mo/Al$_2$O$_3$ catalyst at a hydrogen pressure of 9 MPa, an LHSV of 0.5 Hr$^{-1}$, and a temperature of 340° C., followed by removing light fractions and hydrodewaxing treatment in the presence of a zeolite catalyst at a hydrogen pressure of 9 MPa, a LHSV of 1.5 Hr$^{-1}$, and a temperature of 350° C., to obtain a mineral base oil having properties as shown in Table 1.

Base Oil 6

A commercially available naphthenic mineral base oil having properties as shown in Table 1 was used.

TABLE 1

|  | Base Oil 1 | Base Oil 2 | Base Oil 3 | Base Oil 4 | Base Oil 5 | Base Oil 6 |
|---|---|---|---|---|---|---|
| Kinematic viscosity at 100° C. (mm$^2$/s) | 4.8 | 11.0 | 6.0 | 11.0 | 2.3 | 5.6 |
| Aniline point (° C.) | 102 | 110 | 76 | 125 | 78 | 96 |
| % C$_A$ | 4.2 | 5.3 | 12.5 | 0 | 9.9 | 0 |
| Aromatic content by chromatography (mass %) | 22 | 27 | 40 | 0 | 25 | 0 |
| DMSO extractable content (%) | 0.7 | 1.4 | 2.1 | 0.2 | 0.6 | 0.3 |

Preparation of Process Oils

The extracts (EXT) obtained in the manner as described above were admixed with the mineral base oils as listed in Table 1, at mass ratios shown in Table 2 as "EXT/Oil mixing ratio" to obtain process oils having properties as shown in Table 2.

Evaluation of the Process Oils

The process oils prepared in Examples 1 to 3 and Comparative Examples 1 to 3 in the aforementioned manner were mixed and kneaded, based upon a typical SBR compounding recipe (JIS K6383 "Styrene-butadiene rubber (SBR)—Emulsion and solution polymerized types—Evaluation Procedures") using the ingredients and the composition ratio as shown in Table 3. The SBR used in the recipe was JSR #1500 by Japan Synthetic Rubber Co. Ltd., while commercially available materials were used as other ingredients.

TABLE 3

| Compounding ingredients | Composition ratio (parts by mass) |
|---|---|
| SBR | 100 |
| Process Oil | 40 |
| Carbon black | 50 |
| Zinc oxide | 3 |
| Stearic acid | 2 |
| Vulcanization accelerator | 1 |
| Sulfur | 2 |

The resulting vulcanized rubber products were evaluated for hardness (JIS K6301 "Physical testing methods for vulcanized rubber"), tensile strength, 300% tensile stress, elongation (JIS K6251 "Tensile testing methods for vulcanized rubber"), and tear strength (JIS K6252 "Rubber, vulcanized or thermoplastics, determination of tear strength"). Oil bleeding (or not) was evaluated by observed the feature of specimens which were allowed to stand for three days at room temperature. The results of these tests were summarized in Table 4.

TABLE 2

|  | Example 1 | Example 2 | Example 3 | Comparative Example 1 | Comparative Example 2 | Comparative Example 3 |
|---|---|---|---|---|---|---|
| Base oils used | Base Oil 1 | Base Oil 2 | Base Oil 3 | Base Oil 4 | Base Oil 5 | Base Oil 6 |
| EXT/Oil mixing ratio by mass | 80/20 | 70/30 | 75/25 | 70/30 | 85/15 | 75/25 |
| Kinematic Viscosity at 100° C. (mm$^2$/s) | 28.7 | 31.3 | 31.3 | 31.1 | 29.4 | 30.3 |
| Aniline point(° C.) | 87 | 91 | 81 | 96 | 82 | 86 |
| % C$_A$ | 20.0 | 18.3 | 21.1 | 16.7 | 24.1 | 17.2 |
| Aromatic content by chromatography (% mass) | 62 | 59 | 64 | 50 | 65 | 54 |
| Evaporation mass change rate (%) | 0.1 | <0.1 | <0.1 | <0.1 | 0.7 | 0.1 |
| Mutagenicity index | <1 | <1 | <1 | <1 | <1 | <1 |

TABLE 4

|  | Example 1 | Example 2 | Example 3 | Comparative Example 1 | Comparative Example 2 | Comparative Example 3 |
| --- | --- | --- | --- | --- | --- | --- |
| Hardness (Hs, JIS A method) | 45 | 46 | 45 | 46 | 43 | 45 |
| Elongation (%) | 680 | 650 | 680 | 620 | 700 | 660 |
| Tensile strength (MPa) | 15.8 | 16.5 | 16.2 | 14.0 | 16.0 | 15.3 |
| 300% Tensile stress (MPa) | 10.1 | 10.5 | 10.3 | 11.2 | 10.8 | 11.0 |
| Tear strength (MPa) | 4.5 | 4.7 | 4.3 | 3.8 | 4.0 | 3.9 |
| Oil bleeding | None | None | None | Yes | None | Yes |

The process oil of Comparative Example 2 using the base oil 5 could not be used due to bad working efficiency resulted from oil evaporation during compounding, mixing or vulcanizing. Further, Comparative Examples 1 and 3 showed oil bleeding in the compounded rubber stocks, indicating that the process oils of Comparative Examples 1 and 3 do not have sufficient properties. By contrast, Examples 1 to 3 were shown good results in the above evaluation of rubber properties, and exhibited the excellent properties as process oil.

INDUSTRIAL APPLICABILITY

The present invention as described above is useful in providing a process oil to be compounded with rubber polymers to facilitate processing or the like of rubber products, as well as a manufacturing method thereof.

The invention claimed is:

1. A process oil comprising, in a mixing ratio of 95/5 to 5/95 (extract/mineral base oil mass):
   (i) an extract obtained by solvent refining of a deasphalted oil of a vacuum distillation residue, having a DMSO extractable content of less than 3 mass %; and
   (ii) a mineral base oil comprising a raffinate obtained by solvent refining of a vacuum distillate, or a mineral base oil obtained by hydrorefining and/or dewaxing of a raffinate obtained by solvent refining of a vacuum distillate, those mineral base oils having a DMSO extractable content of less than 3 mass %, a kinematic viscosity of 4 to 20 mm$^2$/s at 100° C., a % $C_A$ of 3 to 20, an aniline point of 120° C. or lower, and an aromatic hydrocarbon content of 10 mass % or higher as determined by chromatography;
   wherein the process oil has a kinematic viscosity of less than 32 mm$^2$/s at 100° C., a % $C_A$ of 15 to 30, an aniline point of 100° C. or lower, an evaporation mass variation percentage of 0.5% or lower, and a mutagenicity index of less than 1.

2. The process oil according to claim 1, wherein the extract has a kinematic viscosity of 50 to 100 mm$^2$/s at 100° C., a % $C_A$ of 15 to 35, an aniline point of 90° C. or lower, and an aromatic hydrocarbon content of 60 mass % or higher as determined by chromatography.

3. A method for producing a process oil comprising admixing, in a mass ratio of 95/5 to 5/95, (extract/mineral base oil):
   an extract obtained by subjecting the deasphalted oil, which is obtained by deasphalting a vacuum distillation residue to reduce the carbon residue content to 1.6 mass % or lower, to a solvent refining while controlling the extract yield of 35% to 60%, having a DMSO extractable content of less than 3 mass %; with
   a mineral base oil comprising a raffinate obtained by solvent refining of a vacuum distillate having an atmospheric equivalent boiling point of 300 to 700° C., or a mineral base oil obtained by hydrorefining and/or dewaxing of a raffinate obtained by solvent refining of a vacuum distillate having an atmospheric equivalent boiling point of 300 to 700° C., those mineral base oils having a DMSO extractable content of less than 3 mass %, a kinematic viscosity of 4 to 20 mm$^2$/s at 100° C. a % $C_A$ of 3 to 20, an aniline point of 120° C. or lower and an aromatic hydrocarbon content of 10 mass % or higher as determined by chromatography.

4. The process oil according to claim 1, wherein the mineral base oil comprises a raffinate obtained by solvent refining of a vacuum distillate.

5. The process oil according to claim 1, wherein the mineral base oil is obtained by hydrorefining of a raffinate obtained by solvent refining of a vacuum distillate.

6. The process oil according to claim 1, wherein the mineral base oil is obtained by dewaxing of the raffinate obtained by solvent refining of a vacuum distillate.

7. The process oil according to claim 1, wherein the mineral base oil is obtained by hydrorefining and dewaxing of the raffinate obtained by solvent refining of a vacuum distillate.

* * * * *